Sept. 29, 1970  F. T. HALL  3,530,518
AMPHIBIOUS BOAT TRAILER
Filed July 12, 1968  3 Sheets-Sheet 1
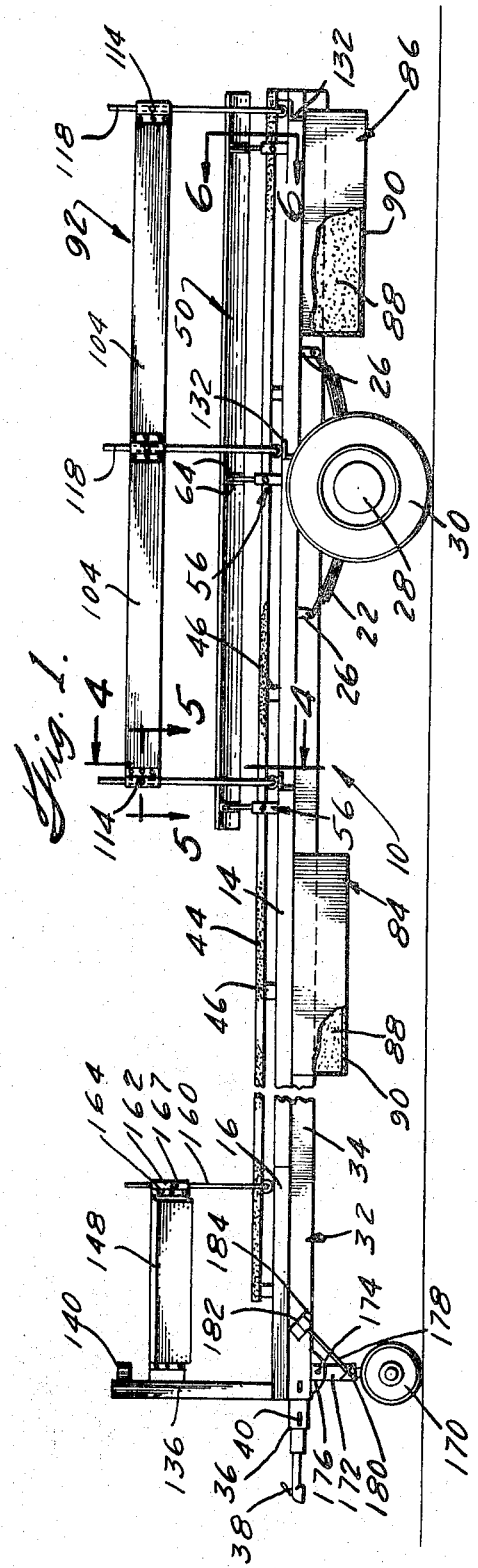
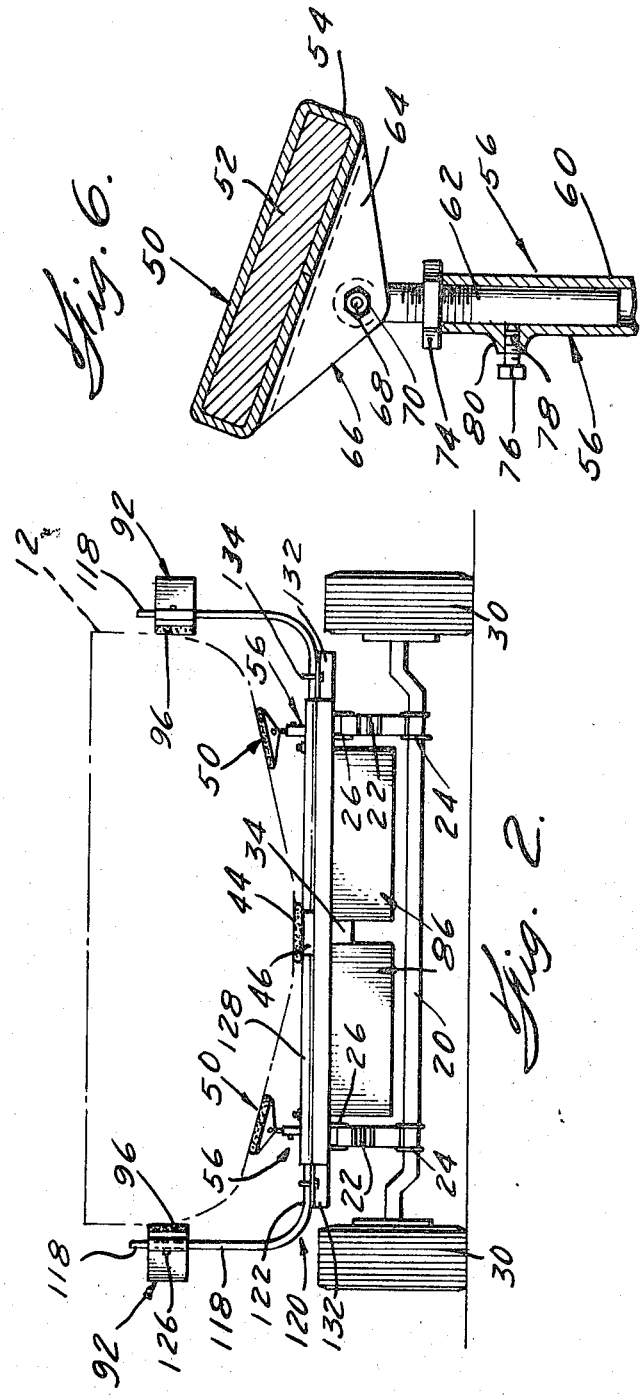
Frank T. Hall,
INVENTOR.
BY *J. C. Barisch*
Attorney

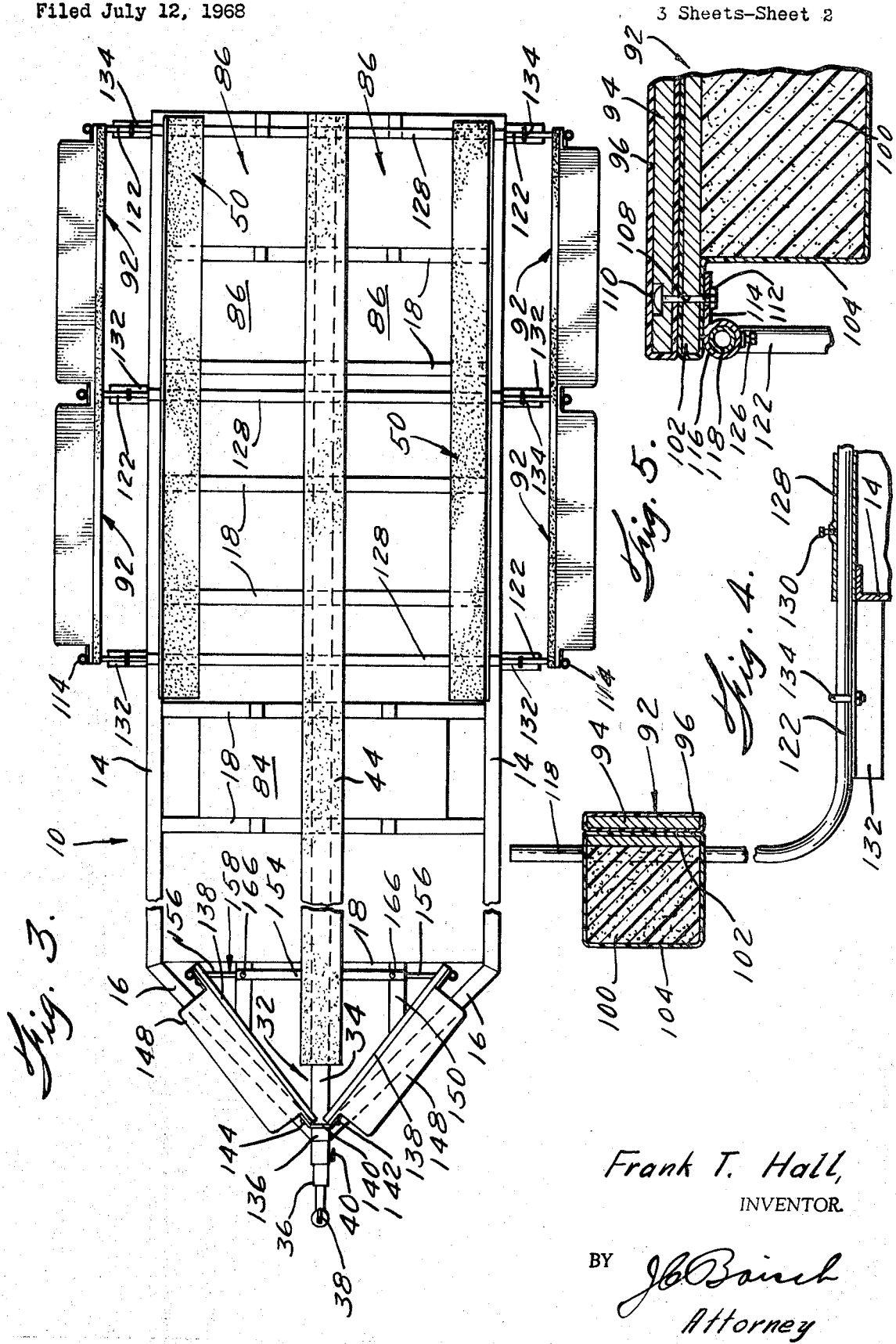

Sept. 29, 1970      F. T. HALL      3,530,518
AMPHIBIOUS BOAT TRAILER
Filed July 12, 1968      3 Sheets-Sheet 3
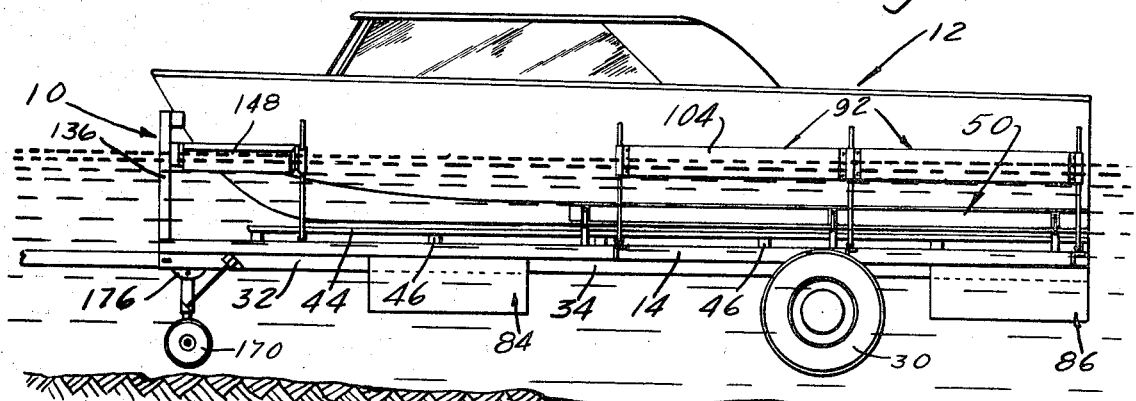
Fig. 7.
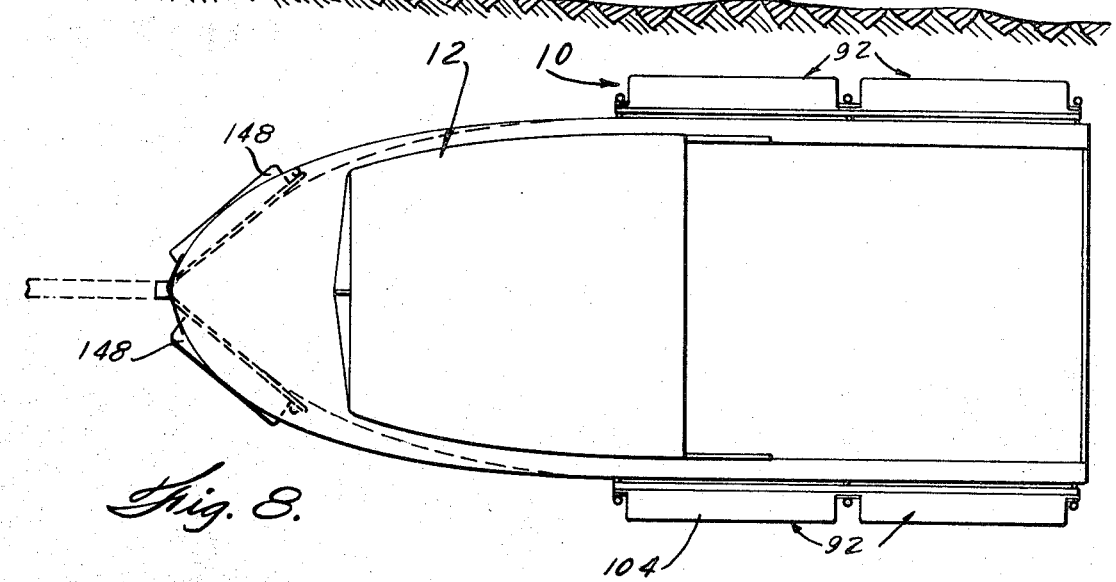
Fig. 8.
Fig. 9.
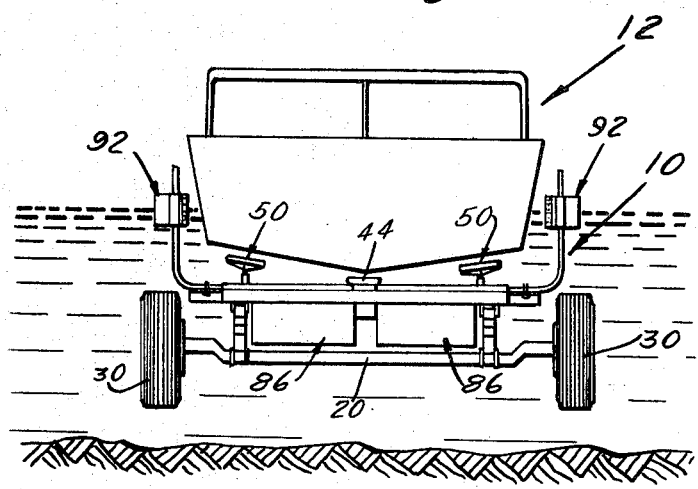
Frank T. Hall,
INVENTOR.
BY
Attorney

United States Patent Office 3,530,518
Patented Sept. 29, 1970

3,530,518
AMPHIBIOUS BOAT TRAILER
Frank T. Hall, 10832 El Rey, Whittier, Calif. 90606
Filed July 12, 1968, Ser. No. 744,481
Int. Cl. B63c 13/00
U.S. Cl. 9—1      7 Claims

ABSTRACT OF THE DISCLOSURE

An amphibious trailer for the launching, docking, transporting and storing of pleasure boats. Flotation cells float the trailer at a depth in the water to allow the boat hull to just clear the bed of the trailer and float over the trailer frame without manual maneuvering or lifting from outside the boat.

BACKGROUND OF THE INVENTION

Field of the invention

The invention relates generally to trailers for boats and relates more particularly to amphibious trailers for transporting, launching, docking and storing pleasure boats and the like and while the invention has particular utility embodied in such a trailer, and is shown and described thus embodied, it is to be understood that its utility is not confined thereto.

State of the prior art and the problems thereof solved by the present invention Boat hulls are built under stress with the bending of frame members and the planking of the hull. The natural result, if all fastenings were released, would be for all the frame and planking members to straighten out to their original form.

When a boat is floating in the water, it displaces an amount of water equal to its weight. This displaced water presses back equally against all surfaces of the hull of the boat and gives perfect support to the boat.

When a boat is placed on conventional trailers, it is supported on two or three rollers along the keel and perhaps four or six rollers along the hull. The entire weight is pressing down on these few spots and a boat's hull can be damaged beyond repair when stored in such a trailer for a long period of time.

The keel is the strongest member of a boat's frame, but many have been damaged to the point that a boat will no longer perform properly in water because of warping of this frame member.

Some boats are supported on planks that give a great deal more support to the hull and keel because they are contoured to the hull and keel and cover a much greater area. The difficulty of this type of support is that the trailer must be submerged to float the boat off as it will not slide off these planks and into the water. When docking, one or more people must go into the water to guide the boat over the trailer because the trailer cannot be seen by the boat pilot. Sometimes very large and powerful winches are used to pull these boats onto this type of trailer, with varying results of broken cables and damaged boat hulls. Often the pulling eye is pulled loose resulting in the stem of the boat being fractured or broken, or the trailer twists as the boat is being pulled out of the water and a roller or some other part of the trailer is forced through the hull of the boat. A great many more accidents have happened to boats as well as to people who have been injured when some of these accidents have happened. The least difficulty is the discomfort of people getting wet on a cold day fighting to get their boat back on the trailer.

BRIEF SUMMARY OF THE INVENTION

The present invention provides a trailer to fit varying hull designs and also to provide flotation equipment to make or convert a conventional trailer into a floating or amphibious trailer.

This is a trailer frame with hull support planks and side guide rails with flotation members attached. Outriggers are provided to support the side guide rails and their flotation members and there are brackets for the outriggers so that the latter may be adjusted laterally of the trailer, the side guide rails and flotation members thereof are also adjustable vertically.

Adjustable hull support means extend longitudinally of the trailer and are adjustable to properly fit the contour of the hull of the boat.

At the forward end of the trailer there is a telescoping trailer tongue and a forward trailer support wheel is provided which is retractable from its lower, operative position to an inoperative position.

The natural flotation of the trailer frame or chassis parts is computed and the flotation members provided will float the trailer frame at a depth in the water to allow the boat hull to just clear the trailer frame and glide over it without manual maneuvering or lifting. Further, the trailer is floated at such a height in the water that the side guide rails will fit the hull with sufficient snugness so the boat hull is positioned perfectly over the frame of the trailer.

OBJECTS OF THE INVENTION

An important object of the invention is to provide an amphibious boat trailer which will float at a depth which will permit the boat to easily and quickly float or glide over the trailer without manual maneuvering or lifting and with the side guide rails providing a snug enough fit for the hull of the boat so as to position it perfectly over the frame of the trailer.

Another object of the invention is to provide an amphibious boat trailer of this character from which a boat may be easily and quickly launched.

It is still another object of the invention to provide an amphibious boat trailer that will provide proper support for the boat so that the hull will not be distorted or injured when disposed on the trailer.

A further object of the invention is to provide an amphibious boat trailer having adjustable parts or elements so as to fit various individual hull designs.

A still further object of the invention is to provide an amphibious boat trailer of the foregoing character that may be embodied in a trailer as standard equipment or that may be used to convert a conventional trailer into an amphibious trailer.

The characteristics and advantages of the invention are further sufficiently referred to in connection with the following description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

Referring to the drawings, which are for illustrative purposes only:

FIG. 1 is a side elevational view of an amphibious trailer embodying the present invention;

FIG. 2 is a rear end elevational view of the trailer;

FIG. 3 is a top plan view of the trailer;

FIG. 4 is an enlarged sectional view taken on line 4—4 of FIG. 1;

FIG. 5 is an enlarged sectional view taken on line 5—5 of FIG. 1;

FIG. 6 is an enlarged sectional view taken on line 6—6 of FIG. 1;

FIG. 7 is a reduced side elevational view of the amphibious trailer operably disposed in the water and with a boat disposed therein and still floating;

FIG. 8 is a top plan view thereof; and

FIG. 9 is a rear end elevational view showing the trailer floating in the water and with the boat floating in position therein.

Referring more particularly to the drawings, the amphibious trailer is indicated generally at 10 and the boat is indicated generally at 12.

The trailer comprises a main frame having longitudinally extending side frame members 14 of channel or other sutable shape. The side frame members have forwardly and inwardly inclined front portions 16 which are joined at the front end of the frame and forming a V. There are also cross members 18 which may be angle irons or the like. The frame parts above described may be secured together by welding or any other suitable means.

There is an axle 20 toward the rear of the trailer, said axle being connected to the respective side frame members by springs of any well known type such as leaf springs 22. The springs are centrally attached to the axle by any well known manner such as by U-bolts 24 or the like. The ends of the springs are connected to the side frame members by shackles 26 of well known character whereby the usual spring action is provided. At each end of the axle is a wheel 28 operably mounted thereon and provided with a pneumatic tire.

At the front of the trailer there is a telescoping tongue, indicated generally at 32 and comprising a tubular member 34 extending from the front end of the trailer along the longitudinal center and secured to the cross members 18 of the trailer by welding or other suitable means, said tubular member being disposed below the cross members 18. Slidable within the tubular member is a tongue member 36 having a hitch 38 at the forward free end whereby the tongue may be attached to a towing vehicle. The tongue member 36 is provided with means for releasably securing it in various telescoping positions, said means being of any suitable character. As shown, said means comprises a pin 40 oppositely disposed in aligned openings provided therefor adjacent the front end of the tubular member 34 adapted to be received in oppositely aligned holes, not shown, in the tongue member 36, there being a plurality of such oppositely aligned holes in the tongue member which are spaced apart longitudinally of the tongue member. When it is desired to change the telescoped position of the tongue member in the tubular member the pin 40 is removed, the tongue member adjusted and the pin replaced in aligned holes of the tubular member and the tongue member.

A keel support means or plank 44 extends along the longitudinal center of the trailer and is disposed on blocks 46 attached to the respective cross members 18 by any suitable means such as bolts, not shown. The keel support plank 44 is secured to the blocks by bolts or other suitable well known means, and is covered with heavy carpeting to protect the keel, the carpeting being secured to the keel plank by any suitable means such as a suitable, waterproof adhesive, for example.

There is a hull support means, indicated generally at 50, extending longitudinally of the trailer at each side of the keel support plank and spaced laterally therefrom in substantially parallel relation to the keel support plank and to each other. The hull support means are the same so a description of one will suffice. There is a hull support plank 52 which is covered with heavy carpeting 54 or other suitable material, as with the keel plank, to protect the hull of a boat carried by the trailer.

Means for supporting the hull plank and adjusting same as to height or vertically is indicated generally at 56 and comprises brackets spaced longitudinally of the hull plank. Each bracket comprises a tubular member 60 secured at its lower end to the respective side frame member 18 by any suitable means such as welding or other like. The tubular member 60 is open at the top and telescopically receives an inner member 62 which is externally threaded, an upper portion of inner member 62 is disposed between side members 64 of a bracket, indicated generally at 66, said brackets being secured to the hull support plank by screws or the like, not shown. Side members 64 of each bracket have aligned openings therein for reception of a bolt 68 which is also received in an opening, not shown, adjacent the upper end of the inner member, the hull plank being adapted to pivot on said bolt 68. Bolt 68 is provided with a nut 70 whereby the side members 64 may be drawn tight on the upper end of the inner member 64 to maintain the hull plank in adjusted position relative to its pivotal movement on the bolt 68.

A nut 74 is disposed on the externally threaded inner member and rests on the upper end of the tubular member 60. Rotation of the nut effects vertical adjustment of the inner member in accordance with the direction of rotation. A set screw 76 is threadedly disposed in a tapped opening 78 in a laterally extending boss 80 to prevent upward movement of the inner member as a result of bumps or the like. Thus the height of the hull planks may be varied to properly support the hull of a boat carried by the trailer and the angle of the hull planks may be adjusted to conform to the bottom of the hull supported by the hull planks. The tightness of the bolts 68 may be such that the hull planks will not loosely rotate on said bolts but will rotate to conform to the bottom of the hull.

Frame buoyancy means is provided and comprises forward and rear flotation cells indicated generally at 84 and 86 respectively, there being a pair of forward flotation cells one disposed at each side of the trailer frame and a pair of rear flotation cells, one disposed at each side of the frame. These flotation cells are of a cellular material 88 such as, for example, Styrofoam which is coated with a suitable imperforate coating 90. For example, the cover or coating is a suitable plastic such as fiber glass. The flotation cells are attached to the cross members 18 of the frame by any suitable means such as bolts, not shown. The frame flotation cells are disposed inwardly of the side frame members 14 and below the cross frame members 18. Also, the forward flotation cells are positioned part way back from the front end of the trailer, the positioning of the flotation cells depends on the construction of the trailer. The trailer is also provided with side guide and buoyancy means, indicated generally at 92. The guide and bouyancy means are the same for each side so a description of one will suffice.

Each of said guide and buoyancy means details of which are best shown in FIGS. 4 and 5, comprises a guide rail or plank 94. The guide plank is shown as a wood plank although it may be of plywood or other suitable material which preferably should be buoyant. The guide plank is covered with heavy carpeting 96 which may be secured to the plank by any suitable means. For example, a suitable waterproof adhesive may be used.

Flotation or buoyancy means 98 is attached to the guide plank. Any suitable number of said buoyancy means 98 may be used, two being shown and termed flotation cells. Each of said buoyancy means comprises a mass 100 of any suitable buoyant material but is shown as plastic of cellular structure. Styrofoam is one example of material that is very satisfactory. The mass of material 100 is secured to a rigid backing member 102 by coating said material 100 and backing member with a cover 104 of imperforate material such as, for example, fiber glass. The backing member is of any suitable material, preferably a buoyant material, such as plywood for example.

The buoyancy means or flotation cells and their backing member are secured to the guide plank by means of bolts 108, one of which is shown in FIG. 5. The heads 110 of the bolts are disposed in recesses provided therefor in the inner side of the guide plank to which the flotation cells or buoyancy means are secured. The bolts extend through the guide plank and through openings provided therefor in the coating and backing member. At the end of each bolt, opposite the head, said bolt is, of course, externally threaded and is provided with a nut 112.

A mounting bracket 114 is disposed on the bolts 108 beneath the respective nuts 112, said mounting brackets having vertically extending tubular parts 116 for slidable reception of vertical parts 118 of outrigger support members indicated generally at 120, said outrigger support members having horizontal parts 122 integral with the respective vertical parts 118.

Thus the guide and flotation means may be adjusted vertically on the vertical parts 118 of the outrigger support members and are secured in adjusted positions by any suitable means such as set screws 126, for example.

In order to provide horizontal adjustment of the outrigger support members the horizontal parts thereof are slidably disposed in tubing 128 which extends transversely of the trailer frame and is secured to the upper side main frame members by welding or other suitable means. Set screws 130 provide means for releasably retaining the outrigger support members in horizontally adjusted position.

Beneath outer end portions of the horizontal parts 122 of the outrigger support members are support means comprising angle irons 132 having their inner ends welded or otherwise suitably secured to the adjacent main frame side members 14. U-bolts 134 releasably secure the horizontal parts 122 to the support means 132.

At the front end of the main frame is an upstanding post 136 to which the forward ends of bow guide rails 138 are attached by means of a bracket having a central part 140 secured to the post 136 by bolts or the like, not shown, and wings 142 to which the forward ends of said guide rails are secured by means of bolts 144 or the like.

There is a bow flotation cell or buoyancy means 148 carried by each of the bow guide rails, said flotation cells being of the same character and construction as the flotation cells described above and are attached to their respective bow guide rails 138 in the same manner as described above in connection with the side flotation cells.

Between the front portions 16 of the main frame members and the adjacent cross member 18 are longitudinally extending secondary frame members 150 which are secured to said portions 16 and cross member 18 by welding or other suitable means, said secondary frame members being spaced apart laterally and are spaced inwardly of the main frame members. Adjacent the rear of said secondary frame members and on top of them is a tube 154 extending transversely of the frame and in the end portions of which horizontal portions 156 of support means, indicated generally at 158, for the rear ends of the bow guide rails. Each of said support means 158 has an upstanding or vertical portion 160 integral with the horizontal portion 156, said upstanding portions 160 being slidably received in tubular sleeves 162 of brackets 164 secured to the rear end portions of the bow guide rails by bolts or any other suitable means, not shown. Set screws 166 are provided for the tube 154 for releasably securing the horizontal portion 156 of the support means 158 in horizontally adjusted positions. Similar means 167 may be provided for the sleeves 162 for releasably securing the rear ends of the bow guide rails in vertically adjusted position.

Means for adjusting the vertical position of the front ends of the bow guide rails may be provided by having a plurality of vertcially spaced holes or openings in the upstanding post 136 and providing a hole in the central part 140 of the bracket for the front ends of said guide rails. A bolt, not shown, provides means for securing the bracket to said post 136. By removing the bolt and adjusting the bracket to bring the hole in the central part 140 thereof into alignment with a hole in the post 136 and then placing the bolt into said aligned holes the height of the front ends of the guide rails is adjusted. A nut, also not shown, would, of course, be used on the bolt to secure same in position.

At the front end of the trailer a retractable forward support wheel 170 is provided, said wheel also being provided with a pneumatic tire. Wheel 170 is rotatably mounted to the lower end of a support member 172 the upper end of which is pivoted by means of a pivot pin 174 to an ear 176 secured to the under side of the tubular member 34 of the telescoping tongue by means of welding or other suitable means. A wheel brace 178 has its lower end pivoted to the support member 172 by means of pivot 180. Brace 178 is slidable in the central tubular part 182 of a bracket 184 welded or otherwise suitably secured to the tubular member 34. Central tubular part 182 is of sufficient cross sectional size to loosely receive said brace and when the brace is in the extended position shown in FIGS. 1 and 7 it is held in place by any suitable means such as a pin 186 for example, there being a hole, not shown, provided adjacent the upper end of the brace for this purpose. When it is desired to retract the wheel the pin 186 is removed and the wheel pivoted rearwardly on the pivot 174. Since the tubular part 182 of the bracket 184 loosely receives the brace said brace will slide upwardly. A hole 188 is provided in the brace for reception of the pin when the wheel is retracted whereby the wheel is releasably retained in the retracted position.

In order to determine the required buoyancy of the flotation cells to maintain the trailer at the required depth in water the weight of the trailer is determined. While various buoyant materials may be used for the flotation cells, Styrofoam will be taken by way of example. It has been found that Styrofoam has a buoyancy support factor 61 pounds of support for each cubic foot, plus the weight of the Styrofoam itself. After finding the weight of the trailer it is necessary to find the natural flotation factor of the trailer frame itself. This means including the volume of the steel in the frame, the axles, and other metal parts of the trailer, the displacement of the side support planks, the keel support planks, the hull support planks, and the displacement of the wheel and tire assemblies. By this weight factor it is determined that $x$ number of cubic feet of flotation is needed to support the trailer in the water. From this is subtracted the cubic feet of natural displacement of the parts of the trailer itself. The balance is the cubic feet of flotation material that must be added to the trailer to make it float.

The next point of consideration is that the trailer frame must float at a depth in the water to allow the boat hull to ride over the trailer frame without manual maneuvering or lifting. Also, it is necessary to hold the trailer at a height in the water so that the side guide rails will form a snug fit for the hull of the boat and thus position the boat perfectly over the frame of the trailer. In order to do this, after determining the amount of flotation material required to float the trailer frame, the certain amount of this flotation material is deducted and the balance installed in the trailer frame. For example, it was found that by deducting two cubic feet of flotation material the trailer submerged completely. The cubic feet of flotation material was then divided and evenly distributed on each side at the front and rear of the trailer which gave about one half cubic foot for each quarter of the trailer. This allowed the side guide rails to float just at the edge of the water. By adding an additional two cubic feet of flotation material and evenly distributing it as above described with one half cubic foot for each quarter of the trailer, the side guide rails were raised so as to be partly out of the water as best shown in FIGS. 7 and 9. Now by adjusting the height of the side guide rails on their support members the depth of the trailer in the water is adjusted so that the keel and hull support planks are spaced a slight distance below the keel and hull of the boat and the side guide planks or rails are spaced slightly outwardly of the sides of the boat hull. The spacing of these support and guide parts from the adjacent parts of the boat need not be great, only an amount just sufficient to allow the boat to freely move on and off the trailer when the latter is in the water.

The foregoing reference to the two cubic feet of flotation material, as well as the following description relative to the determining of the required amount of flotation material and the positioning or distribution thereof on the frame of the trailer is based on a trailer of approximately 750 pounds. Several factors are involved in this respect.

First, it is necessary to determine the fulcrum point of the trailer assembly, that is the frame with all associated parts installed. Then the flotation cells are installed on the trailer frame equally forwardly and rearwardly of the fulcrum point to provide the desired balance and level of the trailer in the water. Since the trailer is symmetrical relative to its longitudinal center, it balances in this respect.

More specifically, with a trailer frame of approximately 750 pounds, 12.3 cubic feet of flotation material is required to float the trailer. With tires having a displacement of 2.86 cubic feet this amount is deducted from the 12.3 cubic feet of flotation material, leaving 9.44 of such material, not taking into account the steel of the trailer frame, axles, etc. The 9.44 cubic feet of flotation material is then reduced by two cubic feet which amount of material is placed on the side guide rails, leaving a total of 7.44 cubic feet of flotation for the trailer frame which is divided among the flotation cells 84 and 86, each having a fourth of the 7.44 cubic feet of material.

In the above described trailer, the fulcrum point is just forward of the main trailer wheels 28 and the trailer balances on this fulcrum point. To provide the proper balance in the water the flotation cells 84 must be positioned or spaced the same distance forwardly of the fulcrum point as the flotation cells 86 are positioned or spaced rearwardly thereof.

The two cubic feet that had been taken from the total flotation requirement, together with another two cubic feet, is disposed on the outside of the side guide planks. It was found that only a slight vertical adjustment of the side guide planks with their flotation cells was needed to position the trailer at the proper depth in the water so that the boat easily slips off and on the trailer. It is to be noted that the trailer is level in the water, that is the keel support planks and the hull support planks are level and the side guide planks are equally spaced from a vertical longitudinally extending plane through the longitudinal center of the trailer so the boat may be easily floated on and off the trailer.

The bow flotation cells 148 aid in keeping the trailer level and in balance in the water as well as aiding in maintaining the stability of the trailer.

The weight and bulk of the trailer below the water level makes it extremely stable and even when the boat is brought onto the trailer at an angle the stability of the trailer itself corrects the course of the boat to place it perfectly between the guide rails or planks.

With a boat mounted on the trailer and the latter attached to a towing vehicle, such as a car, the boat and trailer are hauled to a launching ramp with the trailer backed to the edge of the water while attached to the car. The retractable forward wheel of the trailer, which has been folded out of the way while the trailer is being towed, is lowered and secured in position under the trailer to provide a forward end support.

A hand brake, not shown, on the trailer is set so that it cannot move when it is not attached to the car. Thereafter the pin 40 is removed and the innter tongue member 36, which is still connected to the trailer, is pulled to its extended position and the pin 40 reinserted to hold the inner tongue member in said extended position. The hand brake is then released and the trailer backed into the water to a point whereat it will float at the right depth for the launching of the boat. The boat is then backed from the trailer under its own power, the launching being without strain, danger or inconvenience. After the boat has been launched, the driver of the car drives forwardly and pulls the trailer from the water. Thereafter the necessary steps are taken to telescope the trailer tongue and lock it in the telescoped position. The car and trailer can then be driven to a parking place.

To dock the boat, the foregoing procedure is simply reversed and when the trailer is backed sufficiently far into the water to float at the proper depth, the pilot runs the boat between the guide rails and up into the bow guide rails. The boat is then secured by any suitable well known means such as clamps, not shown, and the trailer pulled out of the water by the car. When the tongue has been telescoped everything is ready to proceed to the highway. Damage to the boat hull is eliminated and there has been no inconvenience or getting into the water by anyone in connecting the docking of the boat.

It is to be understood that very little clearance need be provided between the side guide rails and the sides of the boat and between the hull and keel support planks when the boat is being launched from the trailer and when it is being docked thereon.

The telescoping tongue has been shown and described as having but two telescoping members. However there may be some situations wherein more than two telescoping members would be needed to get the desired extended length for the tongue.

The invention and its attendant advantages will be understood from the foregoing desciption and it will be apparent that various changes may be made in the form, construction and arrangement of the parts of the invention without departing from the spirit and scope thereof or sacrificing its material advantages, the arrangements hereinbefore described being merely by way of example.

I claim:

1. An amphibious boat trailer, comprising:
  (A) a trailer frame assembly having a fulcrum point intermediate the ends of said frame assembly and on which said frame assembly balances so that the weight of the frame assembly forwardly of the fulcrum point is substantially the same as the weight of said frame assembly rearwardly of the fulcrum point;
  (B) flotation means forwardly and rearwardly of the fulcrum point, the flotation means forwardly of the fulcrum point having substantially the same buoyancy capacity and distribution as the flotation means rearwardly of said fulcrum point so that the trailer assembly will be in balance when in the water;
  (C) a longitudinally extending keel support plank, and a longitudinally extending hull support plank at each side of said keel support plank;
  (D) a side guide plank for each side of the trailer;
  (E) means for connecting the side guide planks to the trailer frame;
  (F) means for connecting the side guide planks to the trailer frame comprising a plurality of outrigger members each including a horizontal part and a vertical part, the side guide planks being disposed on the vertical parts and vertically adjustable thereon;
  (G) and means for adjusting the outrigger members horizontally.

2. An amphibious boat trailer, comprising:
  (A) a trailer frame assembly having a fulcrum point intermediate the ends of said frame assembly and on which said frame assembly balances so that the weight of the frame assembly forwardly of the fulcrum point is substantially the same as the weight of said frame assembly rearwardly of the fulcrum point;

(B) flotation means forwardly and rearwardly of the fulcrum point, the flotation means forwardly of the fulcrum point having substantially the same buoyancy capacity and distribution as the flotation means rearwardly of said fulcrum point so that the trailer assembly will be in balance when in the water;

(C) a longitudinally extending keel support plank, and a longitudinally extending hull support plank at each side of said keel support plank;

(D) a side guide plank for each side of the trailer;

(E) means for connecting the side guide planks to the trailer frame;

(F) means for adjusting the side guide planks vertically;

(G) and side flotation cells.

3. The invention defined by claim 2, wherein the side flotation cells are secured to the side guide planks.

4. The invention defined by claim 3, including oppositely disposed bow guide rails connected to the front end of the frame, said bow guide rails having their rear ends spaced apart and said guide rails being inclined forwardly and inwardly, and flotation cells for said bow guide rails.

5. The invention defined by claim 4, including a front wheel retractably mounted beneath the frame of the trailer and adjacent the front end thereof.

6. The invention defined by claim 4, including a telescoping tongue secured to the frame and extending rearwardly from the front end and along the longitudinal center of the trailer frame, said telescoping tongue comprising a tubular member attached to the frame and an inner telescoping member extending forwardly of the tubular member; releasable latch means for securing said inner member in various telescoped position; and a hitch carried by the inner member at the front end thereof.

7. An amphibious boat trailer comprising:

(A) a trailer frame assembly including:
  (a) a main frame, axles on said frame, wheel and tire assemblies on said axles, and adjustable hull support means;
  (b) flotation means attached to the frame assembly to give it equal buoyancy over the entire frame length and to reflect a specific predetermined weight of the frame assembly when totally submerged in water;

(B) A sectional dock assembly arranged at each side of and extending vertically from said frame and including:
  (a) a plurality of outrigger support members connecting the dock assembly to said frame assembly and adjustable horizontally relative to said frame assembly;
  (b) flotation cells having elongated backing members thereon, said flotation cells being arranged on said backing members, and said backing members being mounted on said outrigger support members for vertical adjustment relative thereto, said flotation cells being interconnected to extend generally lengthwise of said frame assembly to provide adequate buoyancy for supporting the total dock assembly and the specific predetermined weight of the frame assembly totally submerged in water, said flotation cells maintaining said dock assembly at a specific height above water level to adequately guide the boat hull therein;
  (c) said dock assembly being in sections along the frame for properly guiding and aligning the boat over the frame.

References Cited

UNITED STATES PATENTS

| | | |
|---|---|---|
| 2,361,951 | 11/1944 | Livermon. |
| 3,122,245 | 2/1964 | Mackusick et al. _____ 214—84 |
| 3,124,259 | 3/1964 | Goettl. |
| 3,365,733 | 1/1968 | Gudmundson. |

TRYGVE M. BLIX, Primary Examiner